United States Patent Office 2,786,785
Patented Mar. 26, 1957

2,786,785

COATING FOR RUBBER MATS

Robert L. Wise, Midland, Mich., assignor to The Dow Chemical Company, Midland, Mich., a corporation of Delaware No Drawing. Application March 28, 1955,
Serial No. 497,441

7 Claims. (Cl. 117—139)

This invention relates to abrasion resistant coatings for rubber mats. It is particularly concerned with synthetic latex compositions useful in coating rubber, and with the rubber articles coated with such compositions.

Rubber floor mats are in common use in area subject to heavy foot traffic, and it is almost universal practice to install such mats in the pedal area of automobiles. The mats may be made of primary rubber, either natural or synthetic, but they are made most often of reclaimed rubber. (For the purposes of this specification, the term primary rubber denotes rubber in its first use in a fabricated article, while the term reclaimed rubber has its conventional connotation.) In either case, but more noticeably when reclaimed rubber is used the mats do not have the degree of abrasion resistance that is desired, and they soon show signs of wear. Further, the mats normally are limited to the dark colors conventional in vulcanized rubber articles, often presenting dull or non-glossy surfaces. With the current trend toward a wide use of so-called decorator colors, both in public buildings and in automobiles, there is need for rubber mats having bright colored surfaces.

Paints and lacquers applied to rubber surfaces tend to soften the rubber due to solvent action. The resulting coatings are not scuff resistant, and the softened rubber has a shorter useful life than uncoated rubber articles.

Accordingly, it is among the principal objects of the present invention to provide abrasion resistant, adherent coatings, capable of carrying any desired pigmentation, for vulcanized rubber mats. A related object is to provide such coatings which can be deformed in a molding operation to the desired surface contour of the mat, as in the preparation of corrugated, dimpled, or other tread plate designs. Another object is to provide a liquid coating composition which is capable of depositing such coatings on rubber surfaces without exerting a softening effect on the rubber.

The composition of the present invention is a mixture of aqueous polymer emulsions, commonly referred to as polymer latexes, together with dispersed pigments, vulcanization accelerator and thickener. More particularly, the polymer emulsions entering into the compositions are the emulsion polymerisates of (A) from 20 to 70 percent styrene and correspondingly from 80 to 30 percent butadiene; (B) vinyl chloride alone or with up to 30 percent of another monoethylenically unsaturated monomer such as vinylidene chloride, vinyl acetate, or diethyl maleate; and (C) from 18 to 48 percent acrylonitrile and correspondingly from 82 to 52 percent butadiene. The individual latexes and dispersions used in making the new compositions are most conveniently of such concentration that the final aqueous composition has a solids content from 40 to 50 percent, or slightly higher.

The emulsion polymerisate of styrene and butadiene may be any of the synthetic rubber-like copolymers of these materials, and may contain as little as 20 or as much as 70 percent of styrene, the balance being butadiene copolymerized therewith. The preferred members of this family are those in which the styrene component predominates, and an especially useful copolymer is that of 2 parts by weight of styrene and 1 part by weight of butadiene.

The predominantly vinyl chloride polymerisate may be polyvinyl chloride, but substantially identical results are obtained when a copolymer is used in which the vinyl chloride component is at least 70 percent, and the other component is vinylidene chloride or vinyl acetate or diethyl maleate. An especially useful copolymer is that of 75 percent vinyl chloride and 25 percent vinylidene chloride.

The butadiene-acrylonitrile polymerisate may be any of the rubbery copolymers in this family, and may contain from 18 to 48 percent acrylonitrile, balance butadiene, though a preferred group of these copolymers contains from 35 to 45 percent acrylonitrile.

The pigment dispersion consists of finely ground pigments to produce the desired color, dispersed in water. The dispersion may be made conveniently by grinding the pigments in water in a colloid mill, with or without dispersing agents or emulsifiers.

The dispersion of a vulcanization accelerator may be made by milling any conventional accelerator, usually with an activator such as zinc oxide or litharge, with water, with or without stearic acid or other dispersing agent or emulsifier, suitably in a ball mill.

The new compositions are prepared by mixing the three latexes, and then adding the pigment dispersion, the accelerator dispersion and, if required to give the desired viscosity, a thickener such as a water solution of the sodium salt of polyacrylic acid, or a water solution of methyl cellulose, or of a water-soluble gum. The proportions of the polymeric constituents of the new composition may vary as shown in the following table, the numerical values representing percent by weight, solids basis.

| Constituent | Range | Preferred |
|---|---|---|
| Styrene-butadiene copolymer | 40–55 | 52 |
| Vinyl chloride polymer of copolymer | 10–40 | 28 |
| Acrylonitrile-butadiene copolymer | 10–50 | 20 |

The amount of pigment, dry basis, will depend on the shade of coating desired, but will generally fall in the range from 30 to 70 percent of the weight of polymeric solids present. Similarly, the amount of accelerator employed will generally be from 3.5 to 8 percent of the weight of polymer solids. When a thickener is employed, it is used in amounts usually between 0.1 and 0.5 percent of the weight of water present. The thickener not only controls the viscosity of the medium, it serves as a protective colloid for the dispersed solids, rendering the composition stable during shipment and storage.

The composition is applied to the surface of rubber mats or similar articles by spraying, by brushing or by roller coating, and the so-treated articles are dried. The article and its dried coating are finished by heating at a temperature which will cause the accelerator to vulcanize the mixed polymers and bond them to the rubber base. This may be done in a mold having the contour of the desired surface, at temperatures from 60° to 160° C., but most generally near 130° C. Curing times vary somewhat inversely with the temperature, in known manner, and for rubber mats of about $\frac{1}{16}$ to $\frac{1}{4}$ inch thickness these times may be from 5 minutes or less to an hour or more. The pigmented coating, when dried and cured, is most desirably from 3 to 5 mils (0.003 to 0.005 inch) thick. Such thicknesses provide the required abrasion resistance and wear life, and serve as effective seals against migration of discoloring constituents of the rubber base to the exposed surface.

The new coatings are at least as flexible as the rubber base to which they are applied, and they exhibit no tendency toward cracking when the base is flexed.

When attempts are made to omit one of the three types of polymers from the coating composition, defects in the coating are noticeable at once. Thus, if there is omitted one of the butadiene copolymers the coating is not sufficiently flexible and has poor adherence to the rubber. When the vinyl polymer is omitted, the abrasion resistance and stain resistance are both reduced below acceptable levels.

The acrylonitrile-butadiene copolymer may be considered to be a polymeric plasticizer for the other polymers present, though it serves other useful functions as well. It has been found that other polymers capable of serving a similar plasticizing function include the ethyl acrylate-methyl methacrylate copolymers, alkyd resins, and epoxylated drying oil fatty acid esters, and these may be substituted for part or all of the acrylonitrile-butadiene copolymer but usually at the expense of some of the desired adherence or stain resistance.

The following examples illustrate the practice of the invention:

Example 1

A mixture of three synthetic latexes was made containing (A) 108 parts by weight of a 48 percent solids latex of a copolymer of 67.5 percent styrene and 32.5 percent butadiene; (B) 54 parts by weight of a 50 percent solids latex of polyvinyl chloride, and (C) 38 parts by weight of a 52 percent solids latex of a copolymer of about 35 percent acrylonitrile and 65 percent butadiene. To this mixture was added 120 parts by weight of a 50 percent solids dispersion in water, prepared on a paint mill, of ultramarine blue pigment and 1 percent of the pigment weight of a nonionic wetting agent. There was then added 12.8 parts by weight of a 56 percent solids dispersion in water of a conventional accelerator mixture, prepared in a ball mill, consisting essentially of mercaptobenzothiazole and benzothiazyl disulfide with zinc oxide. The entire composition was thickened by the addition of 15 parts by weight of a 5 percent solution in water of the sodium salt of polyacrylic acid. The composition had a solids content of about 48 percent, and the solids were present in the following ratios.

| | Percent of polymer solids |
|---|---|
| Styrene-butadiene | 52.6 |
| Polyvinyl chloride | 27.4 |
| Acrylonitrile-butadiene | 20 |
| | 100 |
| Pigment | 60 |
| Accelerator | 7.2 |
| Thickener (percent of water phase) | 0.5 |

Reclaimed rubber was compounded in the conventional manner and sheeted from the mill in an uncured state. The sheets were coated with the pigmented latex composition and the coating was dried in warm air. The coated sheets were then heated under pressure in a platen press at 160° C. for 7 minutes. Each mat was molded in the press between a smooth back plate and a ribbed face plate. The finished mats had a bright blue ribbed surface which was resistant to abrasion and was not discolored even after prolonged exposure to sunlight. The dried coating had a thickness of about 4 mils, and was very adherent to the base sheet, showing no evidence of cracks or other failures either as a result of deformation during molding or after continued flexing of the sheet. Similar results are obtained when the product is shaped and cured in a vacuum mold instead of a press.

Example 2

Substantially identical results were obtained when the same operations were performed with a coating composition like that in Example 1, except that the polyvinyl chloride latex was replaced with a latex of a copolymer of 75 percent vinyl chloride and 25 percent vinylidene chloride. The pigment in this case was golden ochre.

Example 3

Other compositions of the present invention which have been made in like manner to that described above, with various polymer latexes of the classes described, and which have given abrasion resistant flexible coatings on both primary and reclaimed rubber, include the following:

| Component | Parts by weight, solids basis | | | |
|---|---|---|---|---|
| (A) | 43.2 | 50 | 50 | 51.8 |
| (B) | 10 | 30 | 40 | 27.0 |
| (C) | 45 | 20 | 10 | 19.8 |
| Pigment | 50 | 50 | 50 | 60 |
| Accelerator | 4.1 | 4.5 | 4.5 | 7.14 |
| Thickener | 0.5 | 0.25 | 0.25 | 0.75 |

I claim:
1. A liquid coating composition consisting essentially of a mixture of (1) aqueous synthetic polymer latexes, the dispersed polymeric solids consisting of (A) from 40 to 55 percent of a copolymer of from 20 to 70 percent styrene, balance butadiene, (B) from 10 to 40 percent of a polymer selected from the group consisting of polyvinyl chloride and copolymers of at least 70 percent vinyl chloride with not to exceed 30 percent of another monoethylenically unsaturated monomer, and (C) from 10 to 50 percent of a copolymer of from 18 to 48 percent acrylonitrile, balance butadiene; (2) pigment to provide the desired color, and (3) vulcanization accelerator.

2. The composition claimed in claim 1, in which there is also present a protective colloid as a thickener for the aqueous phase.

3. The composition claimed in claim 1, in which the (A) component is a copolymer of about 2 parts styrene and about 1 part butadiene.

4. The composition claimed in claim 1, wherein the (B) component is polyvinyl chloride.

5. The composition claimed in claim 1, wherein the (B) component is a copolymer of at least 70 percent vinyl chloride, balance vinylidene chloride.

6. A vulcanized rubber article carrying a dried adherent coating of the composition claimed in claim 1.

7. The method which comprises coating a rubber article with the composition claimed in claim 1, drying the coating, and curing the article with heat to vulcanize the coating to the article.

References Cited in the file of this patent
UNITED STATES PATENTS

| 2,498,712 | Ryden | Feb. 28, 1950 |
| 2,538,779 | Harrison | Jan. 23, 1951 |
| 2,541,748 | Daly | Feb. 13, 1951 |
| 2,583,387 | Morrissey et al. | Jan. 22, 1952 |
| 2,647,101 | Humphrey | July 28, 1953 |
| 2,731,060 | Rowe | Jan. 17, 1956 |